United States Patent
Tsuneda et al.

(10) Patent No.: US 9,078,185 B2
(45) Date of Patent: Jul. 7, 2015

(54) MOBILE COMMUNICATION SYSTEM, NETWORK APPARATUS, AND MOBILE COMMUNICATION METHOD

(75) Inventors: Takayuki Tsuneda, Chiyoda-ku (JP); Hiroyuki Hosono, Chiyoda-ku (JP); Takaaki Sato, Chiyoda-ku (JP); Takeshi Terayama, Chiyoda-ku (JP); Masafumi Masuda, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 324 days.

(21) Appl. No.: 13/636,745

(22) PCT Filed: Mar. 23, 2011

(86) PCT No.: PCT/JP2011/057009
§ 371 (c)(1),
(2), (4) Date: Nov. 5, 2012

(87) PCT Pub. No.: WO2011/118642
PCT Pub. Date: Sep. 29, 2011

(65) Prior Publication Data
US 2013/0045768 A1 Feb. 21, 2013

(30) Foreign Application Priority Data
Mar. 23, 2010 (JP) .................... 2010-066868

(51) Int. Cl.
*H04W 72/04* (2009.01)
*H04W 36/08* (2009.01)
*H04W 36/32* (2009.01)

(52) U.S. Cl.
CPC .............. *H04W 36/08* (2013.01); *H04W 36/32* (2013.01)

(58) Field of Classification Search
CPC ..... H04W 36/08; H04W 36/06; H04W 36/10; H04W 36/12; H04W 36/14; H04W 36/16; H04W 36/165; H04W 36/18; H04W 36/22; H04W 36/24; H04W 36/34; H04W 36/36; H04W 36/0365; H04W 40/00; H04W 64/00

USPC ......... 455/509, 447, 436, 453, 439, 437, 442, 455/456.1, 410, 411, 414.1, 418, 556.1, 455/457, 513; 370/331, 332

See application file for complete search history.

(56) References Cited

U.S. PATENT DOCUMENTS 5,204,686 A * 4/1993 Petrelis et al. ................. 342/374
6,810,252 B1 * 10/2004 Kwon ........................... 455/436

(Continued)

FOREIGN PATENT DOCUMENTS

| JP | 2009 510969 | 3/2009 |
| KR | 10-0800883 | 2/2008 |
| WO | WO 2007/055504 A1 | 5/2007 |

OTHER PUBLICATIONS

3GPP TSG-RAN WG2 #67, R2-094673, "Discussion on Applying IFRI to non-CSG member UE," LG Electronics Inc., Total 2 Pages, (Aug. 24-28, 2009).

3GPP TS 22.220 V11.5.0, "3rd Generation Partnership Project; Technical Specification Group Services and System Aspects; Service requirements for Home Node B (HNB) and Home eNode B (HeNB)," Total 25 Pages, (Jun. 2012).

(Continued)

*Primary Examiner* — Tan Trinh (74) *Attorney, Agent, or Firm* — Oblon, McClelland, Maier & Neustadt, L.L.P.

(57) ABSTRACT

A mobile communication system 100 includes a selection unit 25 configured to select a transition target frequency from the plurality of frequencies when a condition under which a mobile communication terminal not utilize a transition source frequency being any of the plurality of frequencies is fulfilled, and an instruction unit 22 configured to instruct the mobile communication terminal to perform a transition to the transition target frequency selected by the selection unit. The selection unit 25 excludes the transition source frequency from a frequency candidate to be utilized by the mobile communication terminal until an elapsed time after the instruction of the transition to the transition target frequency exceeds a predetermined time.

8 Claims, 7 Drawing Sheets

(56) References Cited

U.S. PATENT DOCUMENTS

| | | | |
|---|---|---|---|
| 7,315,744 B2 * | 1/2008 | Achour | 455/453 |
| 8,406,736 B2 * | 3/2013 | Das et al. | 455/410 |
| 2002/0137518 A1 * | 9/2002 | Achour | 455/447 |
| 2012/0220316 A1 * | 8/2012 | Jang et al. | 455/457 |
| 2013/0281115 A1 * | 10/2013 | Dupray et al. | 455/456.1 |
| 2013/0288711 A1 * | 10/2013 | Meredith et al. | 455/456.1 |
| 2014/0018100 A1 * | 1/2014 | Yamada et al. | 455/456.1 |
| 2014/0235281 A1 * | 8/2014 | Jang et al. | 455/457 |

OTHER PUBLICATIONS

International Search Report Issued Apr. 26, 2011 in PCT/JP11/57009 Filed Mar. 23, 2011.

Korean Office Action issued Aug. 6, 2014, in Korea Patent Application No. 10-2012-7027200 (with English translation).

Korean Office Action issued Jan. 10, 2014, in Korea Patent Application No. 10-2012-7027200 (with English translation).

* cited by examiner

| USER | LOCATION INFORMATION | FREQUENCY |
|---|---|---|
| A | $(X_A, Y_A)$ | $\alpha$ |
| B | $(X_B, Y_B)$ | $\beta$ |

MOBILE COMMUNICATION SYSTEM, NETWORK APPARATUS, AND MOBILE COMMUNICATION METHOD

TECHNICAL FIELD

The present invention relates to a mobile communication system configured to be capable of utilizing multiple frequencies in a predetermined area, and a network apparatus and a mobile communication method used in the mobile communication system.

BACKGROUND ART

There has known a specific cell referred to as a CSG (Closed Subscriber Group) cell, a home cell, a femtocell, or the like (e.g., NON-PATENT DOCUMENT 1). Note that an access type is configurable in the specific cell. The access type is "Closed," "Hybrid," or "Open".

The "Closed" specific cell is configured to permit only a specific user (UE; User Equipment) to receive provision of services. The "Hybrid" specific cell is configured to permit a specific user to perform communications with a higher quality than other users (non-specific users). The "Open" specific cell is configured to permit all the users to receive provision of services, as is the case with a general macrocell.

Also, there has been known a mobile communication system in which a network side instructs a mobile communication terminal to perform a transition to a different frequency when a predetermined condition is fulfilled. The predetermined condition includes, for example, (a) a non-specific user requests a transition to a specific cell configured with an access type and (b) interference received at a current frequency by a mobile communication terminal exceeds a predetermined threshold.

Note that the "transition" means a change of communication cells (frequencies) when a mobile communication terminal is in communication (Connected). Also, the "transition" means a change of stand-by cells (frequencies) when a mobile communication terminal is in stand-by (Idle).

PRIOR ART DOCUMENT

Non-Patent Document

PATENT DOCUMENT 1: 3GPP TS22.220

SUMMARY OF INVENTION

For example, let us consider a case where a mobile communication terminal is instructed to perform a transition to a cell #2 (a frequency #2) when the mobile communication terminal is in stand-by or in communication in a cell #1 (a frequency #1).

In such a case, it is considered that a re-instruction to perform a transition to a different frequency is needed if the mobile communication terminal having performed the transition to the cell #2 (the frequency #2) requests a transition to the cell #1 (the frequency #1) again.

Also, a frequency allocated to a radio base station is reutilized among multiple radio base stations. Thus, it is not preferable to permanently prohibit the transition to the cell #1 (the frequency #1).

For this reason, the present invention has been made with a view to solving the above problems. Accordingly, an objective of the present invention is to provide a mobile communication system, a network apparatus, and a mobile communication method, which allow a reinstruction of a transition to a different frequency to be properly inhibited.

A mobile communication system according to the first feature is configured to be capable of utilizing a plurality of frequencies in a predetermined area. The mobile communication system includes a selection unit configured to select a transition target frequency from the plurality of frequencies when a condition under which a mobile communication terminal not utilize a transition source frequency being any of the plurality of frequencies is fulfilled;, and an instruction unit configured to instruct the mobile communication terminal to perform a transition to the transition target frequency selected by the selection unit. The selection unit excludes the transition source frequency from a frequency candidate to be utilized by the mobile communication terminal until an elapsed time after the instruction of the transition to the transition target frequency exceeds a predetermined time.

A mobile communication system according to the second feature is configured to be capable of utilizing a plurality of frequencies in a predetermined area. The mobile communication system includes a selection unit configured to select a transition target frequency from the plurality of frequencies when a condition under which a mobile communication terminal not utilize a transition source frequency being any of the plurality of frequencies is fulfilled, an instruction unit configured to instruct the mobile communication terminal to perform a transition to the transition target frequency selected by the selection unit, and an acquisition unit configured to acquire first location information being location information of the mobile communication terminal when the transition to the transition target frequency is instructed, and configured to acquire second location information being location information of the mobile communication terminal when a condition for reselecting a frequency to be utilized by the mobile communication terminal is fulfilled. The selection unit excludes the transition source frequency from a frequency candidate to be utilized by the mobile communication terminal when a distance specified by the first location information and the second location information is shorter than a predetermined distance in a case where the condition for reselecting the frequency to be utilized by the mobile communication terminal is fulfilled.

In the first feature of the second feature, the condition under which the mobile communication terminal not utilize the transition source frequency is that a frequency used in a specific cell to which access from the mobile communication terminal is restricted is the same as the transition source frequency.

In the first feature of the second feature, the condition under which the mobile communication terminal not utilize the transition source frequency is that an amount of interference received at the transition source frequency by the mobile communication terminal exceeds a predetermined amount of interference.

A network apparatus according to the third feature is provided in a mobile communication system configured to be capable of utilizing a plurality of frequencies in a predetermined area. The network apparatus includes a selection unit configured to select a transition target frequency from the plurality of frequencies when a condition under which a mobile communication terminal not utilize a transition source frequency being any of the plurality of frequencies is fulfilled, and an instruction unit configured to instruct the mobile communication terminal to perform a transition to the transition target frequency selected by the selection unit. The selection unit excludes the transition source frequency from a frequency candidate to be utilized by the mobile communication terminal until an elapsed time after the instruction of the transition to the transition target frequency exceeds a predetermined time.

A network apparatus according to the fourth feature is provided in a mobile communication system configured to be capable of utilizing a plurality of frequencies in a predetermined area. The network apparatus includes a selection unit configured to select a transition target frequency from the plurality of frequencies when a condition under which a mobile communication terminal not utilize a transition source frequency being any of the plurality of frequencies is fulfilled, an instruction unit configured to instruct the mobile communication terminal to perform a transition to the transition target frequency selected by the selection unit, and an acquisition unit configured to acquire first location information being location information of the mobile communication terminal when the transition to the transition target frequency is instructed, and configured to acquire second location information being location information of the mobile communication terminal when a condition for reselecting a frequency to be utilized by the mobile communication terminal is fulfilled. The selection unit excludes the transition source frequency from a frequency candidate to be utilized by the mobile communication terminal when a distance specified by the first location information and the second location information is shorter than a predetermined distance in a case where the condition for reselecting the frequency to be utilized by the mobile communication terminal is fulfilled.

A mobile communication method according to the fifth feature is applied to a mobile communication system configured to be capable of utilizing a plurality of frequencies in a predetermined area. The method includes a step A of selecting a transition target frequency from the plurality of frequencies when a condition under which a mobile communication terminal not utilize a transition source frequency being any of the plurality of frequencies is fulfilled, a step B of instructing the mobile communication terminal to perform a transition to the transition target frequency selected at the step A, and a step C of excluding the transition source frequency from a frequency candidate to be utilized by the mobile communication terminal until an elapsed time after the instruction of the transition to the transition target frequency exceeds a predetermined time.

A mobile communication method according to the sixth feature is applied to a mobile communication system configured to be capable of utilizing a plurality of frequencies in a predetermined area. The method includes a step A of selecting a transition target frequency from the plurality of frequencies when a condition under which a mobile communication terminal not utilize a transition source frequency being any of the plurality of frequencies is fulfilled, a step B of instructing the mobile communication terminal to perform a transition to the transition target frequency selected at the step A, a step C of acquiring first location information being location information of the mobile communication terminal when the transition to the transition target frequency is instructed, and acquiring second location information being location information of the mobile communication terminal when a condition for reselecting a frequency to be utilized by the mobile communication terminal is fulfilled, and a step D of excluding the transition source frequency from a frequency candidate to be utilized by the mobile communication terminal when a distance specified by the first location information and the second location information is shorter than a predetermined distance in a case where the condition for reselecting the frequency to be utilized by the mobile communication terminal is fulfilled.

MODES FOR CARRYING OUT THE INVENTION

A mobile communication system according to embodiments of the present invention is described below by referring to the drawings. In the following description of the drawings, same or similar reference numerals are given to denote same or similar portions.

Moreover, the drawings are schematic ones and proportions of sizes and the like are different from actual ones. Thus, specific sizes and the like should be judged by referring to the description below. In addition, the drawings naturally include portions where relationships or percentages of sizes are different among the drawings.

[Summary of Embodiment]

Firstly, a mobile communication system according to an embodiment is configured to be capable of utilizing multiple frequencies in a predetermined area. The mobile communication system includes a selection unit configured to select a transition target frequency among multiple frequencies when a condition under which a mobile communication terminal not utilize a transition source frequency being any one of the multiple frequencies is fulfilled, and an instruction unit configured to instruct a mobile communication terminal to perform a transition to the transition target frequency selected by the selection unit. The selection unit excludes the transition source frequency from the frequency candidates to be utilized by the mobile communication terminal until an elapsed time after the instruction of the transition to the transition target frequency exceeds a predetermined time.

In the present embodiment, the selection unit excludes the transition source frequency from the frequency candidates to be utilized by the mobile communication terminal until an elapsed time after the instruction of the transition to the transition target frequency exceeds a predetermined time.

Accordingly, without permanently prohibiting the transition to the transition source frequency, it is possible to inhibit a transition to a different frequency from being repeatedly reinstructed in a short period of time.

Secondly, a mobile communication system according to an embodiment is configured to be capable of utilizing multiple frequencies in a predetermined area. The mobile communication system includes a selection unit configured to select a transition target frequency among multiple frequencies when a condition under which the mobile communication terminal not utilize a transition source frequency being any of the multiple frequencies is fulfilled, an instruction unit configured to instruct a mobile communication terminal to perform a transition to the transition target frequency selected by the selection unit, and an acquisition unit configured to acquire first location information being location information of the mobile communication terminal when the transition to the transition target frequency is instructed, and configured to acquire second location information being location information of the mobile communication terminal when a condition for reselecting a frequency to be utilized by the mobile communication terminal is fulfilled. The selection unit excludes the transition source frequency from the frequency candidates to be utilized by the mobile communication terminal when a distance specified by the first location information and the second location information is shorter than a predetermined distance in a case where the condition for reselecting the frequency to be utilized by the mobile communication terminal is fulfilled.

In the embodiment, the selection unit excludes the transition source frequency from the frequency candidates to be utilized by the mobile communication terminal when the distance specified by the first location information and the second location information is shorter than the predetermined distance.

Accordingly, without permanently prohibiting the transition to the transition source frequency, it is possible to inhibit a transition to a different frequency from being repeatedly reinstructed during a short period of time

[First Embodiment]

(Configuration of Mobile Communication System)

Figure 1:
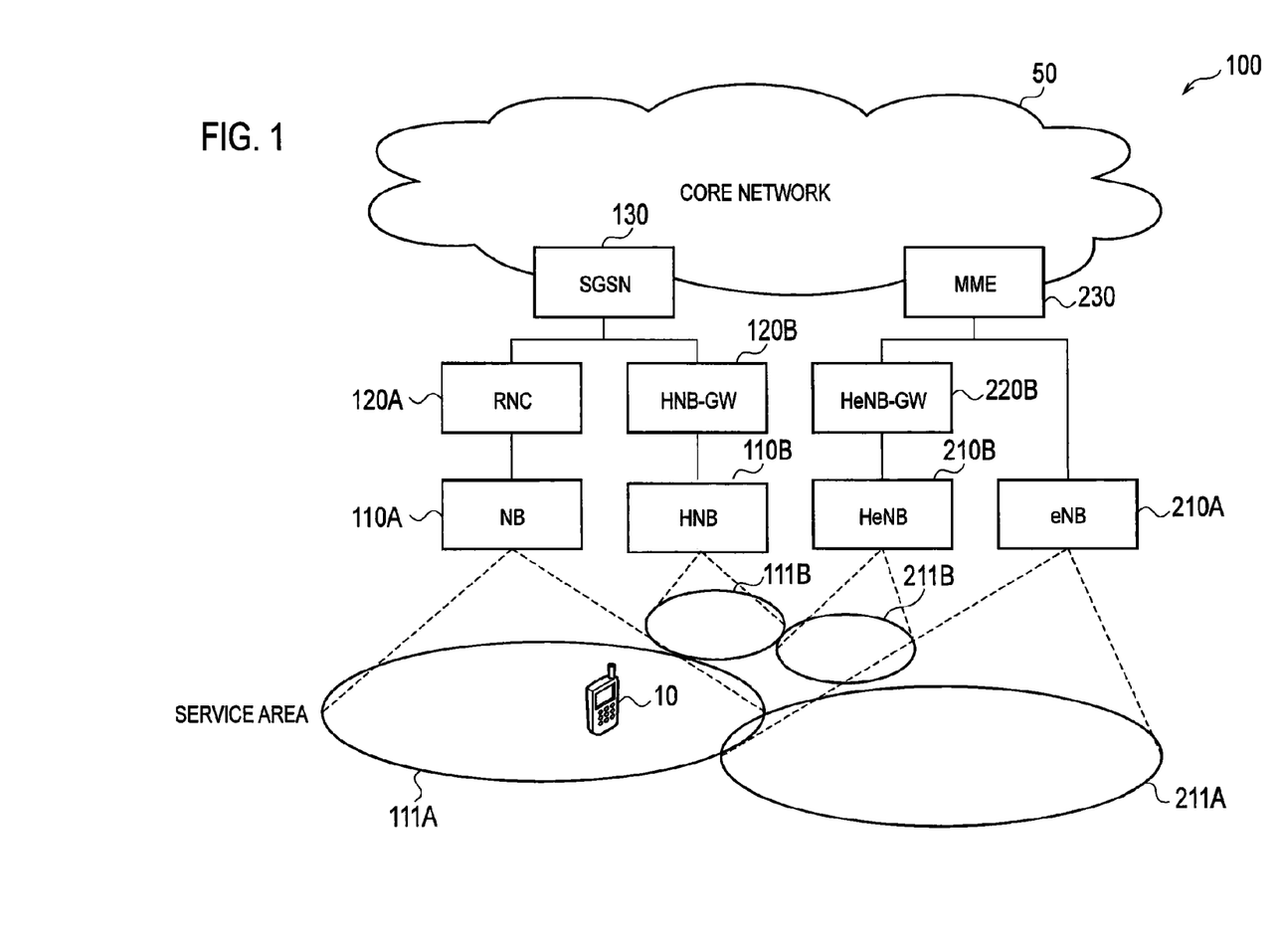
FIG. 1 is a drawing showing a mobile communication system 100 according to a first embodiment.

The configuration of a mobile communication system according to a first embodiment is described below by referring to the drawings. FIG. 1 is a drawing showing a mobile communication system 100 according to the first embodiment.

As shown in FIG. 1, the mobile communication system 100 includes a mobile terminal device 10 (hereinafter, EU 10) and a core network 50. In addition, the mobile communication system 100 includes a first communication system and a second communication system.

For example, the first communication system 100 is a communication system supporting UMTS (Universal Mobile Telecommunication System). The first communication system has a base station 110A (hereinafter NB 110A), a home base station 110B (hereinafter HNB 110B), a RNC 120A, a home base station gateway 120B (hereinafter, HNB-GW 120B), and an SGSN 130.

Note that a radio access network (UTRAN; Universal Terrestrial Radio Access Network) supporting the first communication system includes the NB 110A, HNB 110B, RNC 120A, and HNB-GW 120B.

For example, the second communication system is a communication system supporting LTE (Long Term Evolution). The second communication system has, for example, a base station 210A (hereinafter eNB 210A), a home base station 210B (hereinafter HeNB 210B), a home base station gateway 220B (hereinafter, HeNB-GW 220B), and an MME 230.

Note that a radio access network (E-UTRAN; Evolved Universal Terrestrial Radio Access Network) supporting the second communication system includes the eNB 210A, HeNB 210B, and HeNB-GW 220B.

The UE 10 is a device (User Equipment) configured to communicate with the first communication system or the second communication system. For example, the UE 10 has a function to perform radio communications with the NB 110A and the HNB 110B. Instead, the UE 10 has a function to perform radio communications with the eNB 210A and the HeNB 210B.

The NB 110A is a device (NodeB) having a macrocell 111A and configured to perform radio communications with the UE 10 present in the macrocell 111A.

The HNB 110B is a device (Home NodeB) having a specific cell 111B and configured to perform radio communications with the UE 10 present in the specific cell 111B.

The RNC 120A is a device (Radio Network Controller) connected with the NB 110A and configured to establish a radio connection (RRC Connection) with the UE 10 present in the macrocell 111A.

The HNB-GW 120B is a device (Home NodeB Gateway) connected with the HNB 110B and configured to establish a radio connection (RRC Connection) with the UE 10 present in the specific cell 111B.

The SGSN 130 is a device (Serving GPRS Support Node) configured to exchange packets in a packet exchange domain. The SGSN 130 is provided in the core network 50. Although omitted in FIG. 1, a device (MSC; Mobile Switching Center) to perform line switching in a line switching domain may be provided in the core network 50.

The eNB 210A is a device (evolved NodeB) having a macrocell 211A and configured to perform radio communications with the UE 10 present in the macrocell 211A.

The HeNB 210B is a device (Home evolved NodeB) having the specific cell 211B and configured to perform radio communications with the UE 10 present in the specific cell 211B.

The HeNB-GW 220B is a device (Home evolved NodeB Gateway) connected with the HeNB 210B and configured to manage the HeNB 210B.

The MME 230 is a device (Mobility Management Entity) connected with the eNB 210A and configured to manage mobility of the UE 10 establishing the radio connection with the eNB 210A. Also, the MME 230 is a device connected with the HeNB 210B via the HeNB-GW 220B and configured to manage the mobility of the UE 10 establishing the radio connection with the HeNB 210B.

Note that the macrocell and the specific cell should be understood as functions to perform radio communications with the UE 10. However, the macrocell and the specific cell are also used as terms to express service areas of cells. Also, a cell such as the macrocell or the specific cell is identified by a frequency, spread code, or time slot, which is used in a cell.

The specific cell is sometimes referred to as a femtocell, a CSG (Closed Subscriber Group), or a home cell. Also, the specific cell is configured to be configurable with an access type for defining UEs 10 allowed to access the specific cell. The access type is "Closed," "Hybrid," or "Open".

The "Closed" specific cell is configured to permit only a specific user (UE; User Equipment) managed by the specific cell to receive provision of services.

The "Hybrid" specific cell is configured to permit a specific user managed by the specific cell to perform communications with a high quality and is configured to permit a non-specific user not managed by the specific cell to perform communications with a best effort quality.

The "Open" specific cell is configured to permit all the UEs 10 to receive provision of services, as is the case with the macrocell. Here, in the "Open" cell, UEs 10 can perform communications with equal quality without being distinguished as to whether the UEs 10 are managed by the specific cell.

Note that the access type may be an "ACCESS CLASS BARRED" to prohibit an access of the UE 10 by each access class, or a "CELL BARRED" to prohibit an access of the UE 10 by each cell.

(Example of Cell Configuration)

Figure 2:
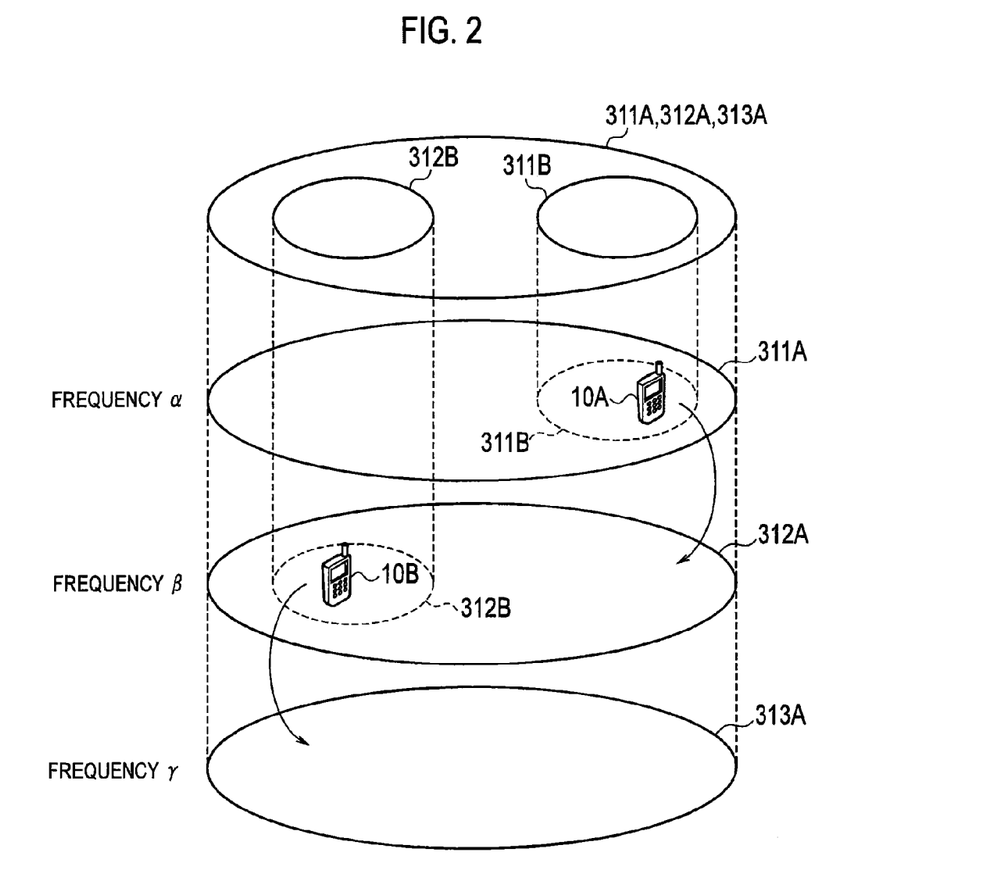
FIG. 2 is a drawing showing an example of a cell configuration according to the first embodiment.

An example of a cell configuration according to the first embodiment is described below by referring to the drawings. FIG. 2 is a drawing showing an example of a cell configuration according to the first embodiment. Here, three frequencies ($\alpha$ to $\gamma$) are described as an example. Also, a macrocell 311A, a macrocell 312A, and a macrocell 313A have a same service area. In this manner, in the mobile communication system 100, multiple frequencies can be used in a predetermined area.

As shown in FIG. 2, provided at the frequency $\alpha$ is one specific cell 311B having a service area overlapping with a service area of the macrocell 311A. Also, the service area of the specific cell 311B is smaller than the service area of the macrocell 311A.

At the frequency $\beta$, there are provided two specific cells 312B, each having a service area overlapping with the service area of the macrocell 312A. In addition, the service area of the macrocell 312A is smaller than the service area of the macrocell 312A.

At the frequency y, there is provided no specific cell having a service area overlapping with the service area of the macrocell 313A.

It should be noted that in Fig. 2, macrocells are generally referred to as a macrocell 311A to a macrocell 313A without having the macrocell 111A and the macrocell 211A distinguished from each other. Similarly, it should be noted that specific cells are generally referred to as a specific cell 311B to a specific cell 312B without having the specific cell 111B and the specific cell 211B distinguished from each other.

Let us consider a case where the UE 10 utilizing the macrocell 111A (the frequency $\alpha$) is prohibited from accessing the specific cell 311B, that is, a case where the UE 10A is a non-specific user. The radio field intensity from the specific cell 311B is considered to increase in the UE 10A because the UE 10A comes closer to the specific cell 311B. In such a case, even when a transition request is transmitted from the UE 10A to the specific cell 311B, the transition request is rejected. Instead, interference received by the UE 10A becomes larger due to the radio field from the specific cell 311B. In other words, the UE 10A cannot stay in stand-by or continue communication at the frequency $\alpha$. Accordingly, the network side instructs the UE 10A to perform a transition to a different frequency (e.g., the frequency $\beta$). However, it should be noted that even though the instruction to perform a transition to a different frequency (e.g., the frequency $\beta$) is made, the UE 10A is highly likely to request the transition to the specific cell 311B again when the UE 10A comes closer to the specific cell 311B.

Similarly, let us consider a case where the UE 10B utilizing the macrocell 312A (the frequency $\beta$) is prohibited from accessing the specific cell 312B, that is, a case where the UE 10B is a non-specific user. The radio field intensity from the specific cell 312B is considered to increase in the UE 10B because the UE 10B comes closer to the specific cell 312B. In such a case, even when a transition request is transmitted from the UE 10B to the specific cell 312B, the transition request is rejected. Instead, interference received by the UE 10B becomes larger due to the radio field from the specific cell 312B. In other words, the UE 10B cannot stay in stand-by or continue communication at the frequency $\beta$. Accordingly, for example, the network side instructs the UE 10B to perform a transition to a different frequency (e.g., the frequency $\gamma$).

However, it should be noted that even though the instruction to perform a transition to a different frequency (e.g., the frequency $\gamma$) is made, the UE 10B is highly likely to request the transition to the specific cell 312B again when the UE 10B comes closer to the specific cell 312B.

(Configuration of Network Apparatus)

Figure 3:
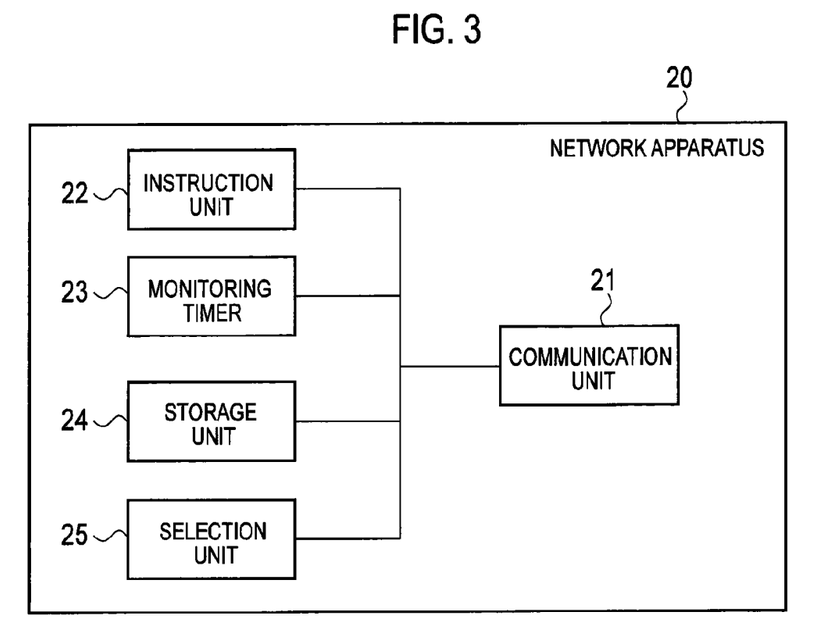
FIG. 3 is a drawing showing a network apparatus 20 according to the first embodiment.
Figure 4:
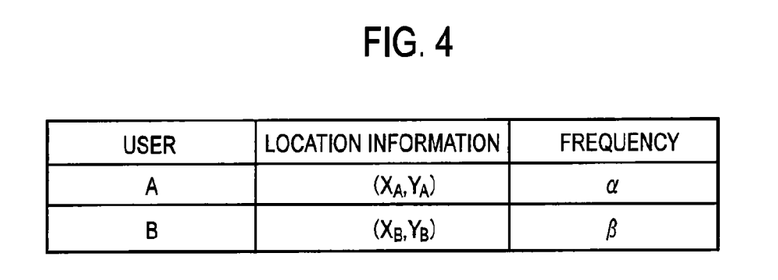
FIG. 4 is a drawing showing an example of information stored in a storage unit 24 according to the first embodiment.

The configuration of the network apparatus according to the first embodiment is described below by referring to the drawings. FIG. 3 is a drawing showing the network apparatus 20 according to the first embodiment. As shown in FIG. 3, the network apparatus 20 has a communication unit 21, an instruction unit 22, a monitoring timer 23, a storage unit 24, and a selection unit 25.

Note that the network apparatus 20 may be a device (such as NB 110A, eNB 210A) which manages a macrocell. Also, the network apparatus 20 may be a device (such as RNC 120A, SGSN 130, MME 230) which is provided in an upper level of an apparatus managing a macrocell.

In addition, in the following description, illustrated is a case where a cell shown in FIG. 2 is provided under the control of the network apparatus 20.

The communication unit 21 performs communications with the UE 10. Also, the communication unit 21 performs communications with other network apparatus.

For example, the communication unit 21 receives a transition request to the specific cell 311B or the specific cell 312B from the UE 10 (non-specific user) via a device (HNB 110B, HNB-GW 120B, HeNB210B or HeNB-GW 220B) managing the specific cell 311B or the specific cell 312B. Instead, the communication unit 21 receives a report of an increased amount of interference indicating that the amount of interference received by the UE 10 exceeds a predetermined amount of interference.

Also, the communication unit 21 receives (acquires) location information (first location information) of the UE 10 from the UE 10 when the condition under which a mobile communication terminal not utilize a transition source frequency being any of the multiple frequencies (e.g., the frequencies $\alpha$, $\beta$, $\gamma$ shown in FIG. 2) is fulfilled. In other words, the communication unit 21 receives (acquires) the location information (first location information) of the UE 10 from the UE 10 when instructing the transition to the transition target frequency.

Note that the location information of the UE 10 may be acquired by the GPS function provided in the UE 10. Instead, the location information of the UE 10 maybe acquired by a delay time (Propagation Delay) of the radio base station managing the specific cell or the macrocell and the UE 10 (e.g., see 3GPP TS25.433 Subclause 9.2.2.26). In Propagation Delay, the network apparatus 20 acquires the location information of the UE 10 based on the delay time acquired from the radio base station managing the specific cell or the macrocell.

Here, the condition under which the mobile communication terminal not utilize a transition source frequency is (a) a frequency used by a specific cell to which access from the UE 10 is restricted is the same as the transition source frequency or (b) an amount of interference received by the UE 10 at the transition source frequency exceeds a predetermined amount of interference.

Furthermore, the communication unit 21 receives (acquires) the location information (second location information) of the UE 10 from the UE 10 when the condition for reselecting the frequency to be utilized by the UE 10 is fulfilled.

As described above, the location information of the UE 10 may be acquired by the GPS function provided in the UE 10.

Instead, the location information of the UE 10 may be acquired by a delay time (Propagation Delay) of the radio base station managing the specific cell or the macrocell and the UE 10 (e.g., see 3GPP TS25.433 Subclause 9.2.2.26).

Here, the condition for reselecting the frequency to be utilized by the UE 10 is that (a) the UE 10 requests a start of communication or (b) a channel established with the UE 10 is switched from a shared channel to a dedicated channel. Here, when the amount of data (in an uplink direction or a downlink direction) of the communication performed by the UE 10 increases, the shared channel is switched to the dedicated channel. In contrast, when the amount of data (in an uplink direction or a downlink direction) of the communication performed by the UE 10 decreases, the dedicated channel is switched to the shared channel.

The instruction unit 22 instructs the UE 10 to perform a transition to a different frequency when the condition under which a mobile communication terminal not utilize the transition source frequency is fulfilled. Note that the transition target frequency to which the UE 10 should perform the transition is selected by the selection unit 25 to be described later. In other words, the instruction unit 22 instructs the UE 10 to perform a transition to the transition target frequency selected by the selection unit 25.

The monitoring timer 23 is a timer for monitoring an elapsed time after the instruction to the US 10 to perform the transition to the transition target frequency. The monitoring timer 23 is set with a predetermined monitoring time and is configured to count down the time set in the monitoring timer 23. However, the monitoring timer 23 maybe configured to count up the elapsed time after the instruction to the US 10 to perform the transition to the transition target frequency.

The storage unit 23 stores various pieces of information needed for the operation of the network apparatus 20. For example, the storage unit 24 stores the location information (first location information) of the UE 10 in association with the UE 10 when the UE 10 is instructed to perform the transition to the transition target frequency. The storage unit 24 acquires the transition source frequency and stores the transition source frequency in association with the UE 10 when the UE 10 is instructed to perform the transition to the transition target frequency.

Also, the storage unit 24 stores the location information of a specific cell provided in a neighborhood of the macrocell provided under the control of the network apparatus 20. Such location information of the specific cell may be registered in advance by an operator or the like. Instead, such location information of the specific cell may be specified by acquiring broadcast information from the specific cell by a radio base station (NB 110A or eNB 210A) having the macrocell and acquiring the broadcast information acquired by the radio base station from the radio base station.

The selection unit 25 selects a frequency to be utilized by the UE 10. Specifically, the selection unit 25 selects the frequency to be utilized by the UE 10 when any of the following two conditions is fulfilled.

Firstly, the selection unit 25 selects a transition target frequency among the multiple frequencies (e.g., the frequencies α, β, γ shown in FIG. 2) usable in the predetermined area when the condition under which the UE 10 not utilize the transition source frequency is fulfilled.

Secondly, the selection unit 25 selects a transition target frequency among the multiple frequencies (e.g., the frequencies α, β, γ shown in FIG. 2) usable in the predetermined area when the condition for reselecting the frequency to be utilized by the UE is fulfilled.

Here, the selection unit 25 excludes the transition source frequency stored in the storage unit 24 from frequency candidates to be utilized by the UE 10 until the monitoring timer 23 times out.

Also, the selection unit 25 excludes the transition source frequency stored in the storage unit 24 from the frequency candidates to be utilized by the UE 10 when a distance specified by the location information (first location information) of the UE 10 and the location information (second location information) of the UE 10 is shorter than a predetermined distance. In other words, the selection unit 25 includes the transition source frequency stored in the storage unit 24 in the frequency candidates to be utilized by the UE 10 when a distance specified by the location information (first location information) of the UE 10 and the location information (second location information) is longer than a predetermined distance. In other words, the selection unit 25 includes the transition source frequency in the frequency candidates to be utilized by the UE 10 even before the monitoring timer 23 times out when a difference (distance) between the location specified by the first location information and the location specified by the second location information is longer than the predetermined distance.

(Operation of Network Apparatus)

Figure 5:
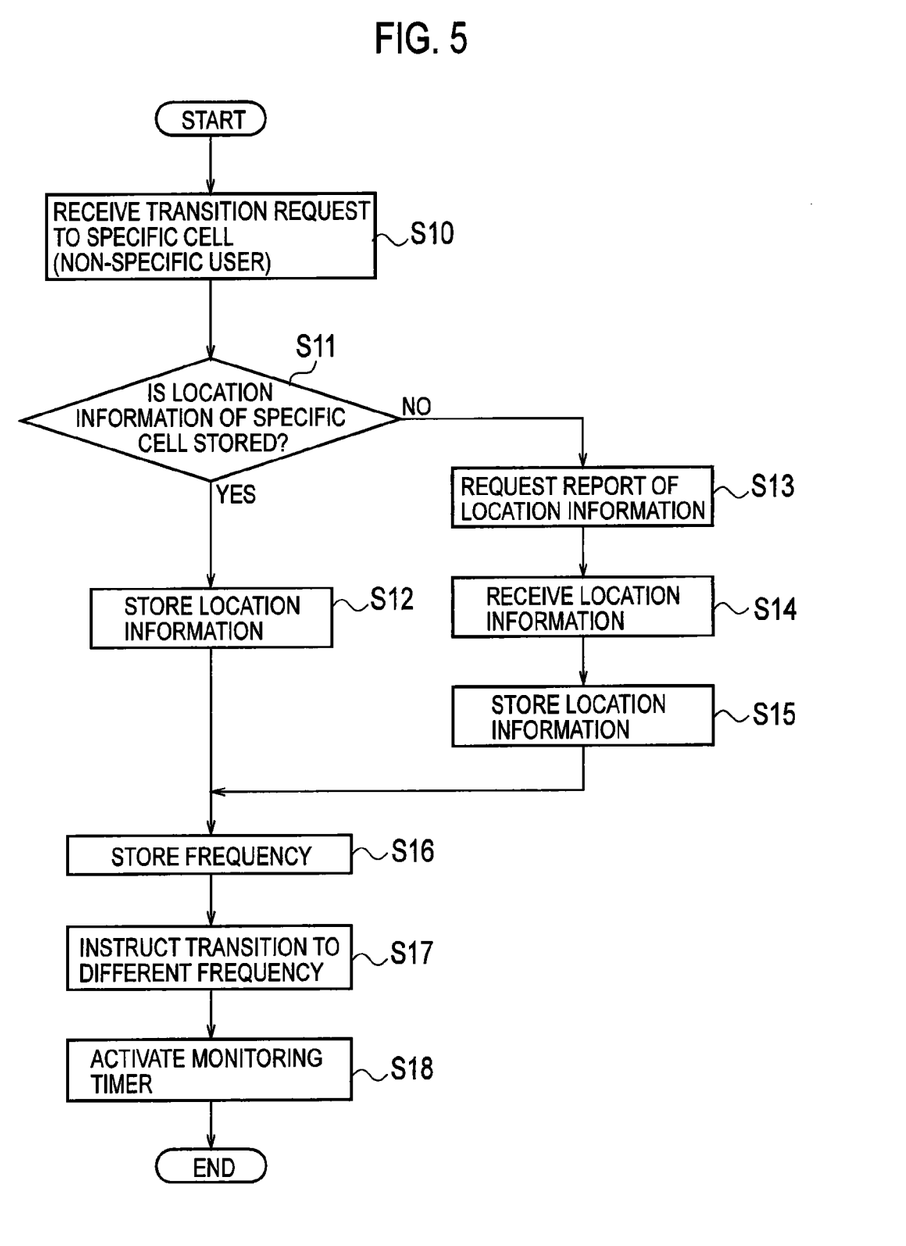
FIG. 5 is a flowchart showing an operation of the mobile communication system 100 according to the first embodiment.
Figure 6:
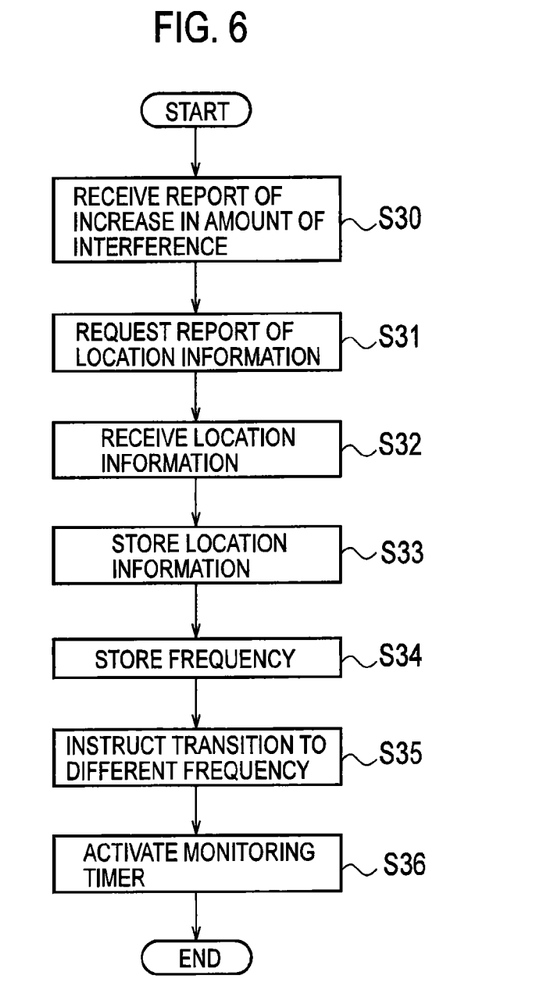
FIG. 6 is a flowchart showing an operation of the mobile communication system 100 according to the first embodiment.
Figure 7:
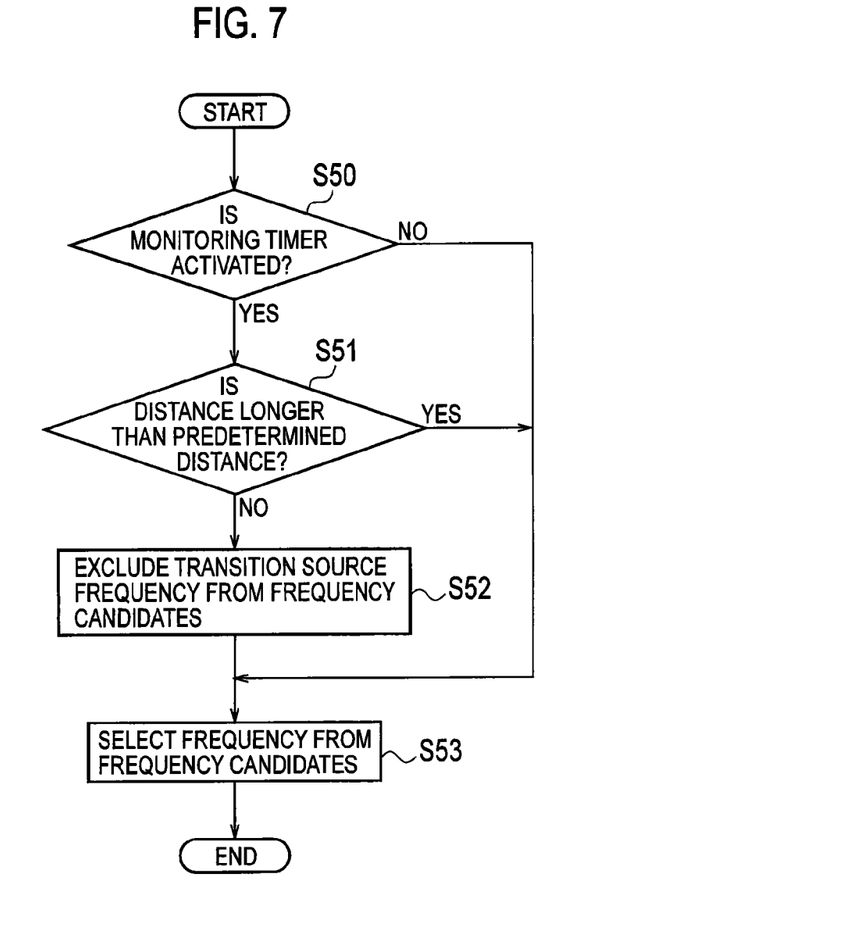
FIG. 7 is a flowchart showing an operation of the mobile communication system 100 according to the first embodiment.

An operation of the network apparatus according to the first embodiment is described below by referring to the drawings. FIGS. 5 to 7 are flowcharts, each showing an operation of the network apparatus 20 according to the first embodiment.

Firstly, referring to FIG. 5, the description is given to a case where a frequency used in a specific cell to which access from the UE 10 is restricted is the same as a transition source frequency.

As shown in FIG. 5, at Step 10, the network apparatus 20 receives a transition request to a specific cell from the UE (non-specific user). Note that the network apparatus 20 receives the transition request to the specific cell via a device managing the specific cell. Of course, the transition request includes a reconnection request caused by a synchronization loss of the UE 10 (non-specific user).

At Step 11, the network apparatus 20 determines if location information of the specific cell to which the UE 10 (non-specific user) requests the transition is stored in the storage unit 24. When the location information of the specific cell is stored in the storage unit 24, the network apparatus 20 proceeds to processing at Step 12. When the location information of the specific cell is not stored in the storage unit 24, the network apparatus 20 proceeds to processing at Step 13.

At Step 12, the network apparatus 20 stores the location information of the specific cell as location information (first location information) of the UE 10.

At Step 13, the network apparatus 20 requests the UE 10 to report the location information of the UE 10.

At Step 14, the network apparatus 20 receives the location information (first location information) of the UE 10 from the UE 10. Note that the UE 10 may acquire the location information by GPS (Global Positioning System). Instead, the UE 10 may acquire the location information based on broadcast information provided in the neighborhood of the UE 10.

At Step 15, the network apparatus 20 stores the location information (first location information) of the UE 10, which was received at step S14, in the storage unit 24. Note that, the location information of the UE 10 may be acquired by a delay time (Propagation Delay) of the radio base station managing the specific cell or the macrocell and the UE 10 (e.g., see 3GPP TS25.433 Subclause 9.2.2.26).

At Step 16, the network apparatus 20 stores the frequency (transition source frequency) currently being utilized by the UE 10 in the storage unit 24.

At Step 17, the network apparatus 20 instructs the UE 10 to perform the transition to a different frequency.

At Step 18, the network apparatus 20 activates the monitoring timer 23. For example, the network apparatus 20 sets a predetermined monitoring time in the monitoring timer 23.

Secondly, referring to FIG. 6, the description is given to a case where an amount of interference received by the UE 10 at the transition source frequency exceeds a predetermined amount of interference.

As shown in FIG. 6, at Step 30, the network apparatus 20 receives a report of an increased amount of interference indicating that the amount of interference received by the UE 10 at the frequency (transition source frequency) currently utilized by the UE 10 exceeds the predetermined amount of interference.

At Step 31, the network apparatus 20 requests the UE 10 to report the location information of the UE 10.

At Step 32, the network apparatus 20 receives the location information (second location information) of the UE 10 from the UE 10. Note that the UE 10 may acquire the location information by GPS (Global Positioning System). Instead, the UE 10 may acquire the location information based on broadcast information provided in the neighborhood of the UE 10.

At Step 33, the network apparatus 20 stores the location information (second location information) of the UE 10, which was received at step S32, in the storage unit 24. Note that, the location information of the UE 10 may be acquired by a delay time (Propagation Delay) of the radio base station managing the specific cell or the macrocell and the UE 10 (e.g., see 3GPP TS25.433 Subclause 9.2.2.26).

At Step 34, the network apparatus 20 stores the frequency (transition source frequency) currently being utilized by the UE 10 in the storage unit 24.

At Step 35, the network apparatus 20 instructs the UE 10 to perform the transition to a different frequency.

At Step 36, the network apparatus 20 activates the monitoring timer 23. For example, the network apparatus 20 sets a predetermined monitoring time in the monitoring timer 23.

Thirdly, referring to FIG. 7, the description is given to an operation of reselecting the frequency to be utilized by the UE 10. In other words, the flow shown in FIG. 7 starts by using the following (a) or (b) as a trigger.

(a) The UE 10 requests the start of communication.

(b) The channel established with the UE 10 is switched from a shared channel to a dedicated channel.

As shown in FIG. 7, at Step 50, the network 20 determines if the monitoring timer 23 is activated. When the monitoring timer 23 is activated, the network apparatus 20 proceeds to processing at Step 51. When the monitoring timer 23 times out, the network apparatus 20 proceeds to processing at Step 53.

At Step 51, the network apparatus 20 determines if a distance specified by the first location information and the second location information is longer than a predetermined distance. When the distance is longer than the predetermined distance, the network apparatus 20 proceeds to processing at Step 53. When the distance is not longer than the predetermined distance, the network apparatus 20 proceeds to processing at Step 52.

At Step 52, the network apparatus 20 excludes the transition source frequency stored in the storage unit 24 from the frequency candidates to be utilized by the UE 10.

At Step 53, the network apparatus 20 selects the transition source frequency from the frequency candidates to be utilized by the UE 10.

In this manner, in a case where the monitoring timer 23 does not time out yet and the distance specified by the first location information and the second location information is not longer than the predetermined distance, the transition source frequency stored in the storage unit 24 is excluded from the frequency candidates to be utilized by the UE 10.

(Advantageous Effects)

In the first embodiment, the selection unit 25 excludes the transition source frequency from the frequency candidate to be utilized by the UE 10 until an elapsed time after the instruction of the transition to the transition target frequency exceeds a predetermined time.

Accordingly, it can be inhibited without permanently prohibiting the transition to the transition source frequency that the transition to a different frequency is repeatedly reinstructed during a short period of time.

In the first embodiment, the selection unit 25 does not exclude the transition source frequency from the frequency candidates to be utilized by the UE 10 even before the monitoring timer 23 times out when a difference (distance) between the location specified by the first location information and the location specified by the second location information is longer than a predetermined distance.

In other words, even though the UE 10 performs the transition to the transition source frequency, but if there is no possibility that a reinstruction of the transition to a different frequency is repeated, the transition source frequency is included in the frequency candidates to be utilized by the UE 10. Accordingly, the usability efficiency of the frequency is improved.

[Modification 1]

Modification 1 of the first embodiment is described below by referring to the drawings. In the following description, portions different from those of the first embodiment are mainly described.

Figure 8:
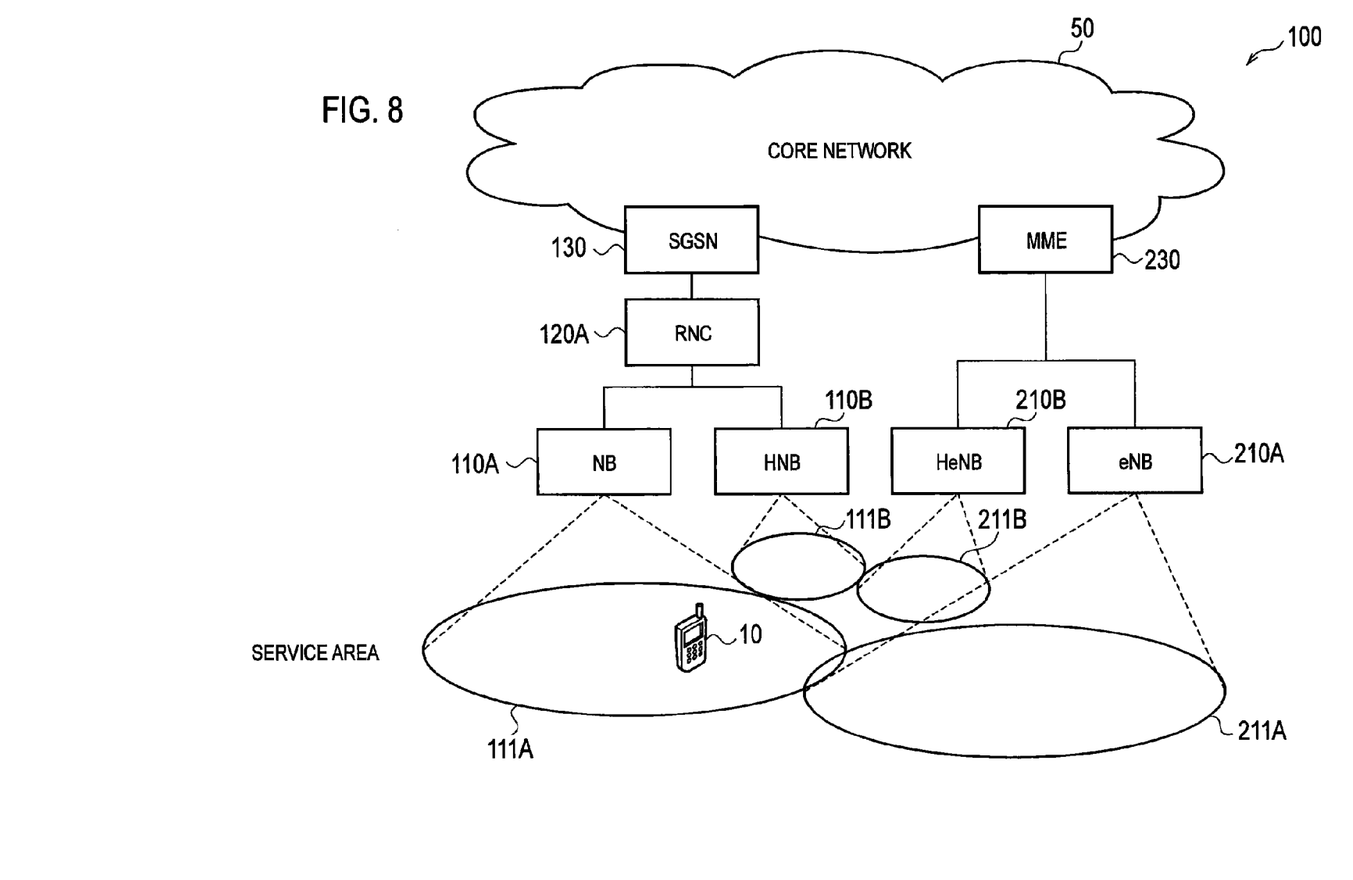
FIG. 8 is a drawing showing a mobile communication system 100 according to Modification 1.

Specifically, in the first embodiment, an upper node of an HNB 110B is an HNB-GW 120B. On the other hand, in Modification 1, as shown in FIG. 8, an upper node of an HNB 110B is a RNC 120A.

In Modification 1, the RNC 120A manages the HNB 110B in place of the HNB-GW 120B. In other words, the RNC 120A provides functions similar to those of the HNB-GW 120B to devices residing under the control of the RNC 120A.

In addition, in the first embodiment, an upper node of the HeNB 210B is a HeNB-GW 220B. On the other hand, in Modification 1, as shown in FIG. 8, an upper node of the HeNB 210B is an MME 230.

In Modification 1, the HeNB 210B provides functions similar to those of the HeNB-GW 220B to devices residing under the control of the HeNB 210B in place of the HeNB-GW 220B.

Note that only the HNB-GB 120B may be omitted or only the HeNB-GW 220B may be omitted.

[Other Embodiments]

The present invention has been described by using the above-described embodiment. However, it not be understood that the description and the drawings, which constitute one part of this disclosure, are to limit the present invention. Various alternative embodiments, examples, and operational techniques will be obvious for those who are in the art from this disclosure.

Although it is not particularly described in the above-described embodiment, in a case where the UE 10 repeatedly performs the transition to a different frequency and there exist multiple transition source frequencies, the storage unit 24 stores location information of the UE 10 and the frequency for each of the multiple transition source frequencies. Also, for each of the multiple transition source frequencies, the selection unit 25 determines whether or not to include the transition source frequency is in the frequency candidates to be utilized by the UE 10.

The network apparatus 20 may determine whether or not to exclude the transition source frequency from the frequency candidates to be utilized by the 10 by only comparing the elapsed time after the instruction of the transition to the transition target frequency with a predetermined time. Instead, the network apparatus 20 may determine whether or not to exclude the transition source frequency from the frequency candidates to be utilized by the UE 10 by only comparing a distance specified by the first location information and the second location information with a predetermined distance.

In the above-described embodiment, illustrated is the case where the configuration (the communication unit 21, the instruction unit 22, the monitoring timer 23, the storage unit 24, and the selection unit 25) which is provided in the network apparatus 20 is provided in one apparatus. However, the embodiment is not limited to that configuration. In other words, the communication unit 21, the instruction unit 22, the monitoring timer 23, the storage unit 24, and the selection unit 25 may be provided in different apparatuses, respectively.

Control signals such as RANAP (Radio Access Network Application Part), NBAP (Node B Application Part), RNSAP (Radio Network Subsystem Application Part), and HNBAP (Home Node B Application Part) are used in communications between respective apparatuses.

Note that an operation of the network apparatus 20 may be implemented by hardware or may be implemented by a software module to be executed by a processor, or may be implemented in combination of the both.

The software module may be provided in any form of a recording medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such recording medium is connected with a processor so that the processor can read and write information on the recording medium. Also, such recording medium may be integrated on the processor. Instead, such recording medium and the processor may be provided inside ASIC. Such ASIC may be provided inside the network apparatus 20. Alternatively, such recording medium and the processor may be provided inside the network apparatus 20 as a discrete component.

Note that the contents of Japanese Patent Application Publication No. 2010-066868 (filed on Mar. 23, 2010) are hereby incorporated by reference in their entirety.

Industrial Applicability

The present invention can provide a mobile communication system, a network apparatus, and a mobile communication method, which allow a transition to a different frequency to be properly inhibited. Thus, the present invention is useful in a radio communication and the like.

EXPLANATION OF THE REFERENCE NUMERALS

10 . . . communication terminal device, 20 . . . network apparatus, 21 . . . communication unit, 22 . . . instruction unit, 23 . . . monitoring timer, 24 . . . storage unit, 25 . . . selection unit, 50 . . . core network, 100 . . . mobile communication system, 110A . . . NB, 110B . . . HNB, 111A . . . macrocell, 111B . . . specific cell, 120A . . . RNC, 120B . . . HNB-GW, 130 SGSN, 210A . . . eNB, 210B . . . HeNB, 211A . . . macrocell, 211B . . . specific cell, 220B . . . HeNB-GW, 230 . . . MME, 311A-313A . . . macrocell, 311B-312B . . . specific cell

The invention claimed is:

1. A mobile communication system configured to be capable of utilizing a plurality of frequencies in a predetermined area, comprising:
   selection circuitry configured to select a transition target frequency from the plurality of frequencies when a condition under which a mobile communication terminal not utilize a transition source frequency being any of the plurality of frequencies is fulfilled; and
   instruction circuitry configured to instruct the mobile communication terminal to perform a transition to the transition target frequency selected by the selection circuitry, wherein
   the selection circuitry excludes the transition source frequency from a frequency candidate to be utilized by the mobile communication terminal until an elapsed time after the
   instruction of the transition to the transition target frequency exceeds a predetermined time.

2. A mobile communication system configured to be capable of utilizing a plurality of frequencies in a predetermined area, comprising:
   selection circuitry configured to select a transition target frequency from the plurality of frequencies when a condition under which a mobile communication terminal not utilize a transition source frequency being any of the plurality of frequencies is fulfilled;
   instruction circuitry configured to instruct the mobile communication terminal to perform a transition to the transition target frequency selected by the selection circuitry; and
   acquisition circuitry configured to acquire first location information being location information of the mobile communication terminal when the transition to the transition target frequency is instructed, and configured to acquire second location information being location information of the mobile communication terminal when a condition for reselecting a frequency to be utilized by the mobile communication terminal is fulfilled, wherein
   the selection circuitry excludes the transition source frequency from a frequency candidate to be utilized by the mobile communication terminal when a distance specified by the first location information and the second location information is shorter than a predetermined distance in a case where the condition for reselecting the frequency to be utilized by the mobile communication terminal is fulfilled.

3. The mobile communication system according to claim 1 or 2, wherein the condition under which the mobile communication terminal not utilize the transition source frequency is that a frequency used in a specific cell to which access from the mobile communication terminal is restricted is the same as the transition source frequency.

4. The mobile communication system according to claim 1 or 2, wherein the condition under which the mobile communication terminal not utilize the transition source frequency is that an amount of interference received at the transition source frequency by the mobile communication terminal exceeds a predetermined amount of interference.

5. A network apparatus provided in a mobile communication system configured to be capable of utilizing a plurality of frequencies in a predetermined area, comprising:
  circuitry configured to
    select a transition target frequency from the plurality of frequencies when a condition under which a mobile communication terminal not utilize a transition source frequency being any of the plurality of frequencies is fulfilled;
    instruct the mobile communication terminal to perform a transition to the selected transition target frequency; and
    exclude the transition source frequency from a frequency candidate to be utilized by the mobile communication terminal until an elapsed time after the instruction of the transition to the transition target frequency exceeds a predetermined time.

6. A network apparatus provided in a mobile communication system configured to be capable of utilizing a plurality of frequencies in a predetermined area, comprising:
  circuitry configured to
    select a transition target frequency from the plurality of frequencies when a condition under which a mobile communication terminal not utilize a transition source frequency being any of the plurality of frequencies is fulfilled;
    instruct the mobile communication terminal to perform a transition to the selected transition target frequency;
    acquire first location information being location information of the mobile communication terminal when the transition to the transition target frequency is instructed, and acquire second location information being location information of the mobile communication terminal when a condition for reselecting a frequency to be utilized by the mobile communication terminal is fulfilled; and
    exclude the transition source frequency from a frequency candidate to be utilized by the mobile communication terminal when a distance specified by the first location information and the second location information is shorter than a predetermined distance in a case where the condition for reselecting the frequency to be utilized by the mobile communication terminal is fulfilled.

7. A mobile communication method applied to a mobile communication system configured to be capable of utilizing a plurality of frequencies in a predetermined area, the method comprising:
  selecting a transition target frequency from the plurality of frequencies when a condition under which a mobile communication terminal not utilize a transition source frequency being any of the plurality of frequencies is fulfilled;
  instructing the mobile communication terminal to perform a transition to the selected transition target frequency; and
  excluding the transition source frequency from a frequency candidate to be utilized by the mobile communication terminal until an elapsed time after the instruction of the transition to the transition target frequency exceeds a predetermined time.

8. A mobile communication method applied to a mobile communication system configured to be capable of utilizing a plurality of frequencies in a predetermined area, comprising:
  selecting a transition target frequency from the plurality of frequencies when a condition under which a mobile communication terminal not utilize a transition source frequency being any of the plurality of frequencies is fulfilled;
  instructing the mobile communication terminal to perform a transition to the selected transition target frequency;
  acquiring first location information being location information of the mobile communication terminal when the transition to the transition target frequency is instructed, and acquiring second location information being location information of the mobile communication terminal when a condition for reselecting a frequency to be utilized by the mobile communication terminal is fulfilled; and
  excluding the transition source frequency from a frequency candidate to be utilized by the mobile communication terminal when a distance specified by the first location information and the second location information is shorter than a predetermined distance in a case where the condition for reselecting the frequency to be utilized by the mobile communication terminal is fulfilled.

* * * * *